Aug. 11, 1964   C. F. FRYLING   3,144,420
HIGH IMPACT POLYSTYRENE
Filed Dec. 18, 1961
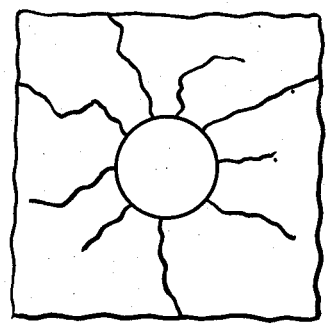
INVENTOR.
CHARLES F. FRYLING.
BY
Oscar B. Brumback.
his ATTORNEY.

United States Patent Office 3,144,420
Patented Aug. 11, 1964

3,144,420
HIGH IMPACT POLYSTYRENE
Charles F. Fryling, Pittsburgh, Pa., assignor to Koppers Company, Inc., a corporation of Delaware
Filed Dec. 18, 1961, Ser. No. 160,032
1 Claim. (Cl. 260—4)

This invention relates to high impact polystyrene. More particularly, the invention relates to novel two phase high impact polymer compositions and to an improved method for preparing such compositions.

Attempts have been made heretofore to produce styrene-based polymers which have high impact resistance, good heat softening characteristics, and good tensile strength qualities. One method of preparing such a polymer has been to use mechanical blends. For example, polystyrene and rubber are mixed together to produce a material which will have the desired attributes. Such materials, however, according to Boundy and Boyer, Styrene, Its Polymers, Copolymers and Derivatives, Reinhold Publishing Corporation, 1952, page 1226 et seq., are deficient in that they do not have good gloss properties, dimensional stability or good heat resistance. Certain of the mixtures also are difficult to mold in that they require a short molding cycle at a high temperature.

To overcome the inherent deficiencies of the mechanical blends, it has been proposed to use polystrene copolymerized in the presence of another material, particularly synthetic rubber. The other material is chosen so that the product has the desired resistance to impact. One class of materials prepared in this manner is referred to as graft copolymers.

The term graft-copolymer describes those polymeric products which essentially consist of main polymer chains to which there is attached by chemical means side chains of different composition. The main polymer chains may be referred to as backbone chains. These backbone chains are derived from polymerizing one or more polymerizable materials. There is then attached, by chemical means, to the main or backbone chains, other polymer chains which are referred to as side chains. These side chains are of different polymers or copolymers than those of the main chains. At least a portion of the side chains of the graft copolymers have one end free, that is, the end is not attached to either the main chain or to other side chains.

In commercial usage, the graft copolymers may be prepared by graft copolymerization with additional polymer to give a product of the desired impact resistant characteristics. It is with this type of composition, i.e., a two phase system of polystyrene and styrene-rubber graft copolymer, that the present invention is concerned.

A method used to produce a two phase system is to dissolve rubber, which is generally polybutadiene, butadiene-styrene copolymer or any similar elastomeric polymer or copolymer, in styrene and to polymerize the resulting solution. When this procedure is followed, the rubber begins to precipitate out of the styrene as soon as an appreciable amount of polystyrene forms. Thus, two polymerizations can then occur simultaneously, the polymerization of the styrene to polystyrene and the graft copolymerization of styrene to the elastomer. In addition, some cross-linking within the elastomer particles takes place. The more cross-linking that occurs, the less elastic the rubber becomes. The cross-linking, if allowed to continue, may reach a point where substantially all elastic properties are lost. Thus, in order to obtain a polystyrene-rubber composition with elastic properties, the polymerization must be stopped short of the point where an undesirable amount of cross-linking has occurred. If the polymerization is stopped short of ultimate conversion, considerably less than all of the monomer is converted to polymer. This is, of course, uneconomical. Conversely, it would be highly desirable to obtain a high rate of conversion without cross-linking and accompanying loss of elasticity.

These disadvantages of the prior art may be avoided and particles of a rubber-styrene graft copolymer of optimum cross-linking, suitably imbedded in a polystyrene matrix, may be produced in high yield by the process of my invention.

According to my invention, the internally cross-linked rubber-styrene graft copolymer compositions are prepared in the presence of polystyrene by polymerizing a mixture which is prepared by intimately mixing a first pre-polymerization solution and a second pre-polymerization solution. The first pre-polymerization solution is prepared by dissolving rubber in styrene; the second pre-polymerization solution is prepared by dissolving polystyrene in styrene. Thereafter, these two solutions are intimately mixed. A very high degree of intimacy is required and is measured by an empirical test. The test has been named the layer test and consists of allowing the mixture of solutions to sit for several hours or over night at the end of which time only two layers should form. If more than two layers form (and up to five have been observed), then mixing is not complete and polymerization of the mixture will not result in the formation of a graft-copolymer structure with the desired characteristics, that is, the resulting polymer will be non-uniform and commercially undesirable instead of the commercially desirable uniform product of the invention.

When the resulting mixture of rubber-styrene particles has been dispersed to the required degree of uniformity, a catalyst, soluble in styrene, is added with adequate mixing to insure its uniform dispersion in the styrene monomer phase.

The polymer compositions comprise two phases, the two phases being polystyrene and styrene-rubber graft copolymer. This composition may hereinafter be referred to simply as graft copolymer structure and this item is meant to embrace the above-described two phase system.

The composition of the invention may be more fully described as a polystyrene matrix which contains uniformly dispersed throughout suboptical particles of a graft copolymer of styrene and rubber. The graft copolymer consists of backbone chains of rubber to which are grafted side chains of polystyrene. The graft copolymer particles should be small enough so that they are not visible to the naked eye. The overall composition should be from 8 to 35% graft copolymer and correspondingly from 92 to 65% polystyrene. If less than this amount of graft copolymer is used, the impact resistance of the composition will not be high enough for a large number of applications, while if more than this amount of graft copolymer is used, no useful increase in impact resistance is obtained, and if it is increased to a very great extent, the impact resistance decreases.

In the production of the composition of my invention, it has been found necessary that one of the two pre-polymerization solutions consists of polystyrene dissolved in styrene. If a portion of polystyrene is not present, then the resulting polymer composition is too highly cross-linked to be of commercial utility. It is believed that the amount and type of polystyrene initially present controls the extent of cross-linking in the grafted copolymer particles. The amount of polystyrene which is to be dissolved in the styrene may be varied from about 4 to 18 parts of the total composition.

The other pre-polymerization solution comprises rubber dissolved in styrene. The reason for the rubber is to impart impact resistance to the composition.

The graft copolymer itself should be about 4 to 16 parts rubber and 2.5 to 30 parts polystyrene. If this ratio is not adhered to, the graft copolymer will not have the desired properties.

Elastomeric materials usable in accordance with the invention include natural rubber and synthetic rubbers, such as the butyl rubbers, the diene rubbers, the isoprene rubbers and butadiene rubbers.

The initiator used is not of particular importance in and of itaself but, as is well known, is dependent upon the particular polymerization cycle used. For instance, benzoyl peroxide, cumene hydroperoxide, t-butyl perbenzoate and di-ti-butyl-peroxide have all been used succesfully alone and in some cases in combination with each other. Other initiators, or as they are sometimes referred to, catalysts, known to be useful in the polymerization of styrene may equally well be used.

The method of polymerization is not critical and the polymer composition of the invention has been successfully produced using both mass and suspension polymerization as well as a combination of both methods wherein the first portion of the polymerization is carried out in mass and then completed in suspension. Polymerization recipes which are useful are set out, for example, in Boundy and Boyer.

It is very important that the two solutions, polystyrene dissolved in styrene and rubber dissolved in styrene, be intimately mixed. As was pointed out above, if this is not done, then there generally results a nonuniform composition which is at most of limited utility. The mixing may be carried out in a gear pump or similar device such as a colloid mill.

The reason for the improved properties of the polymer composition of my invention is not definitely known. However, it is suggested that these properties may be due to the particular structure of the composition.

The single sheet of drawing schematically represents the proposed structure for the two phase system of the invention.

As shown in the drawing, in a highly idealized version, the graft copolymer particles comprise in part a number of rubber molecules, which are the backbone portion of the polymer. There is attached to these backbone molecules a number of tentacles, the side chains, which in this case are polystyrene. These particles of graft copolymer are in a matrix of polystyrene and they are held in place by the polystyrene tentacles which extend out into the polystyrene matrix.

The following examples further illustrate the practice of the invention.

EXAMPLE I

A solution of 30 parts of polystyrene having a molecular weight of about 180,000 in 70 parts of styrene was prepared. Another solution of 16 parts of a styrene-butadiene synthetic rubber in 84 parts of styrene was prepared and filtered to remove non-soluble material. The two solutions were intimately mixed by first stirring and then passing them through a gear pump twice. To this was added with stirring a third solution of 0.07 part t-butyl perbenzoate and 0.02 part of di-tert-butyl peroxide dissolved in one part styrene. The mixed solution was then added to a 100-gallon reaction kettle containing 200 parts of water, together with 0.14 part of polyvinyl alcohol, a suspending agent, and 0.16 part of sodium chloride which is useful in the prevention of emulsion polymerization. The reaction kettle was agitated and heated during polymerization. The heating schedule followed was to heat to 110° C., hold at 110° C. for four hours, then heat to 140° C. and hold for four hours. Heating was then stopped and the beads which had formed were recovered, washed and dried.

The beads were passed through an extruder and the propeties determined. The tensile (ASTM N638–60T) was 4620 p.s.i., the modulus (ASTM D638–60T) was 304 p.s.i.$\times 10^{-3}$, the percent elongation (ASTM 638–60T) was 52, the Izod impact (D256–56) was 4.9 inch pounds.

EXAMPLE II

As has been pointed out above, the particular conditions of polymerization are not critical. The series of experiments set out in the table below more fully demonstrates this. In these experiments different rubbers and catalyst systems were used. Inspection of the results indicate that the ingredients and procedure used are adequate if the two pre-polymerization solutions are properly mixed.

*Table 1*

TWO PHASE SYSTEMS PREPARED IN VARIOUS WAYS

| Expt. No. | Polymerization cycle (polymzr.time-temp²) | Ratio, styrene/ polystyrene/ rubber | Initiator | Plasticizer (parts) | Extrusion, No. passes | Molding conditions ||| Tensile strength (p.s.i.) | Modulus (p.s.i.× 10⁻³) | Elongation (percent) | Izod impact strength (ft. lbs./in.) |
|---|---|---|---|---|---|---|---|---|---|---|---|---|
| | | | | | | Tensile bar temp. | Flex. bar temp. | Flex. bar pressure | | | | |
| 1 | Low temp. cycle: 7 hr./90° C., 4 hr./115° C. | 77/15/8 | B | 0 | 0 | 430/460 | 380/410 | 1,500 | 5,670 | 363 | 86.6 | 3.7 |
| 2 | 7 hr./90° C., 4 hr./115° C. | 87/ 5/8 | B | 0 | 2 | 415/435 | 375/395 | 1,500 | 5,530 | 371 | 26.7 | 1.4 |
| 3 | 7 hr./90° C., 4 hr./115° C. | 82/10/8 | B | 0 | 2 | 435/455 | 360/380 | 1,500 | 5,610 | 385 | 37.8 | 3.0 |
| 4 | 7 hr./90° C., 4 hr./115° C. | 72/20/8 | B | 0 | 2 | 415/430 | 370/385 | 1,500 | 5,520 | 357 | 62.5 | 2.8 |
| 5 | High temp. cycle: 4 hr./110° C., 4 hr./140° C. | 77/15/8 | A | 2 N | 2 | 420/450 | 395/425 | 1,200 | 4,770 | 299 | 53.4 | 3.0 |
| 6 | 2 hr./120° C., 4 hr./140° C. | 80/15/5 | A | 2 N | 1 | 410/430 | 380/415 | 1,250 | 5,180 | 383 | 39.3 | 2.3 |
| 7 | 2 hr./120° C., 4 hr./140° C. | 77/15/8 | A | 2 NBS | 2 | 400/430 | 315/385 | 1,350 | 4,560 | 324 | 50.3 | 4.2 |
| 8 | 4 hr./110° C., 4 hr./140° C. | 77/15/8 | A | 2 N | 2 | 425/455 | 385/410 | 1,400 | 4,980 | 333 | 59.1 | 4.2 |
| 9 | 2 hr./120° C., 6 hr./140° C. | 77/15/8 | 0.1 dicumyl. | 2 N | 2 | 395/435 | 370/395 | 1,150 | 4,960 | 293 | 44.9 | 2.5 |
| 10 | 2 hr./120° C., 4 hr./140° C. | 77/15/8 | A | 2 N | 2 | 425/455 | 365/385 | 1,500 | 4,210 | 229 | 44.0 | 3.0 |

A—0.07 t-butyl-perbenzoate, 0.02 di-t-butyl peroxide.
B—0.04 benzoyl peroxide, 0.14 cumene hydroperoxide, 0.15 t-butyl perbenzoate.
N—Nujol (heavy medicinal paraffin oil).
NBS—Normal butyl stearate.

NOTE.—The polystyrene used had a molecular weight of about 180,000. With the exception of Run No. 10, the elastomer was a styrene-butadiene rubber. Run No. 10 was a diene rubber.

EXAMPLE III

Example I was repeated except that the two pre-polymerization solutions were grossly mixed and not put through any device such as a gear train. In contrast to Example I wherein the solution contained only two layers, the solution contained four layers. This solution was polymerized following the same heating scheduled as in Example I. The polymer formed when tested as in Example I showed a large spread in the test results, indicating that polymer was not homogeneous.

EXAMPLE IV

To demonstrate that the molecular weight of the polystyrene may be varied, a series of experiments set out below was run.

*Table II*

PHYSICAL PROPERTIES OF 77/15/8 STYRENE-POLYSTYRENE-STYRENE-BUTADIENE RUBBER

| Table No. | Polymerization cycle | Elastomer type No. | Mol. wt. polystyrene | Initiator, parts per 100 | Extrusion | Tensile, p.s.i. | Modulus, p.s.i. × $10^{-3}$ | Elongation, percent |
|---|---|---|---|---|---|---|---|---|
| 1 | 7 hr./90° C., 4 hr./115° C | 1,503 | 180,000 | 0.15 TBP | 3 passes | 5,120 | 303 | 31.4 |
| 2 | 7 hr./90° C., 4 hr./115° C | 1,006 | 180,000 | 0.15 TBP | 2 passes | 5,330 | 343 | 55.3 |
| 3 | 2 hr./120° C., 8 hr./140° C | 1,006 | 180,000 | 0.02 DTBP | 2 passes | 5,530 | 346 | 48.8 |
| 4 | 2 hr./120° C., 8 hr./140° C | 1,503 | 180,000 | 0.02 DTBP | 2 passes | 5,370 | 299 | 50.3 |
| 5 | 7 hr./90° C., 4 hr./115° C | 1,006 | 100,000 | 0.15 TBP | 2 passes | 5,190 | 371 | 41.9 |
| 6 | 7 hr./90° C., 4 hr./115°C | 1,503 | 100,000 | 0.15 TBP | 2 passes | 4,880 | 336 | 23.9 |
| 7 | 8 hr./120° C., 6 hr./140° C | 1,006 | 100,000 | 0.02 DTBP | 2 passes | 5,460 | 329 | 66.3 |
| 8 | 7 hr./90° C., 4 hr./115° C | 1,503 | 28,000 | 0.15 TBP | 2 passes | 4,910 | 359 | 16.3 |
| 9 | 7 hr./90° C., 4 hr./115° C | 1,006 | 28,000 | 0.15 TBP | 1 pass | 5,100 | 372 | 8.3 |
| 10 | 2 hr./120° C., 8 hr./140° C | 1,503 | 28,000 | 0.02 DTBP | 2 passes | 5,060 | 371 | 13.6 |
| 11 | 2 hr./120° C., 12 hr./140° C | 1,006 | 28,000 | 0.02 DTBP | 2 passes | | | |
| 12 | 6 hr./115° C., 2 hr./140° C | 1,503 | | 0.02 DTBP | 1 pass | 5,360 | 318 | 45.8 |

TBP—t-butyl perbenzoate.   DTBP—di-t-butyl peroxide.

EXAMPLE V

To demonstrate that the polymer of my invention does not degrade on working, a typical polymer was made up following the procedure of Example I. The polymer was worked in various ways as reported in Table III below.

*Table III*

Influence of Mechanical Working on Two Phase Graft Copolymer

| Expt. No. | Working | Tensile, p.s.i. | Modulus p.s.i. × $10^{-3}$ | Elong., percent | Izod impact strength ft. lbs./in. |
|---|---|---|---|---|---|
| 1 | 1 pass thru extruder | 4,620 | 304 | 52 | 4.9 |
| 2 | 2 passes thru extruder | 4,860 | 329 | 55 | 4.8 |
| 3 | 4 passes thru extruder | 4,770 | 321 | 48 | 3.9 |
| 4 | Banbury, 5 min | 4,520 | 353 | 52 | 3.9 |
| 5 | Banbury+1 pass | 4,670 | 355 | 46 | 3.7 |
| 6 | Milled 5 min | 4,500 | 360 | 37 | 1.3 |
| 7 | Milled 10 min | 4,860 | 384 | 41 | 0.4 |

These results indicate a high degree of resistance to impact. It is only after a very high degree of working, Run 7 for example, that impact resistance is lost.

A further series of experiments was run to determine the optimum amounts of the reactants. It was determined that impact resistance is at a maximum between 10 and 20 parts of polystyrene while the optimum amount of rubber is between 4 and 12 parts.

The foregoing has described a novel two phase high impact resistant polymer and its method of preparation. The novel polymer has properties not heretofore available in impact resistant formulations and in particular does not degrade on working.

What is claimed is:

A process for producing a high impact polystyrene composition comprised of two phases and idealized as being a polystyrene matrix that has uniformly dispersed throughout it particles of a graft polymer that are so small as to be invisible to the naked eye, the copolymer having a backbone chain of elastomer having grafted thereon side chains of polystyrene, the amount of grafting being sufficient to anchor said particles in said matrix, said process comprising:

(a) forming a solution of rubber in styrene by dissolving in styrene a rubber that is a rubbery polymer of a conjugated diolefin, (b) forming a solution of polystyrene in styrene by dissolving polystyrene in styrene, (c) intimately mixing said two solutions so as to provide a homogeneous mixture which is comprised by weight of

|   | Percent |
|---|---|
| styrene | 72–87 |
| polystyrene | 5–20 |
| rubber | 5–8 |

(d) adding to said homogeneous mixture a polymerization initiator, and (e) polymerizing said homogeneous mixture to form said polystyrene composition.

References Cited in the file of this patent

UNITED STATES PATENTS

| 2,606,163 | Morris et al. | Aug. 5, 1952 |
| 2,957,833 | Baum | Oct. 25, 1960 |

FOREIGN PATENTS

| 766,585 | Great Britain | Jan. 23, 1957 |